Aug. 27, 1929.  F. M. CLEMENT  1,726,177
POWER DRIVEN PLOW
Filed June 28, 1926   3 Sheets-Sheet 1
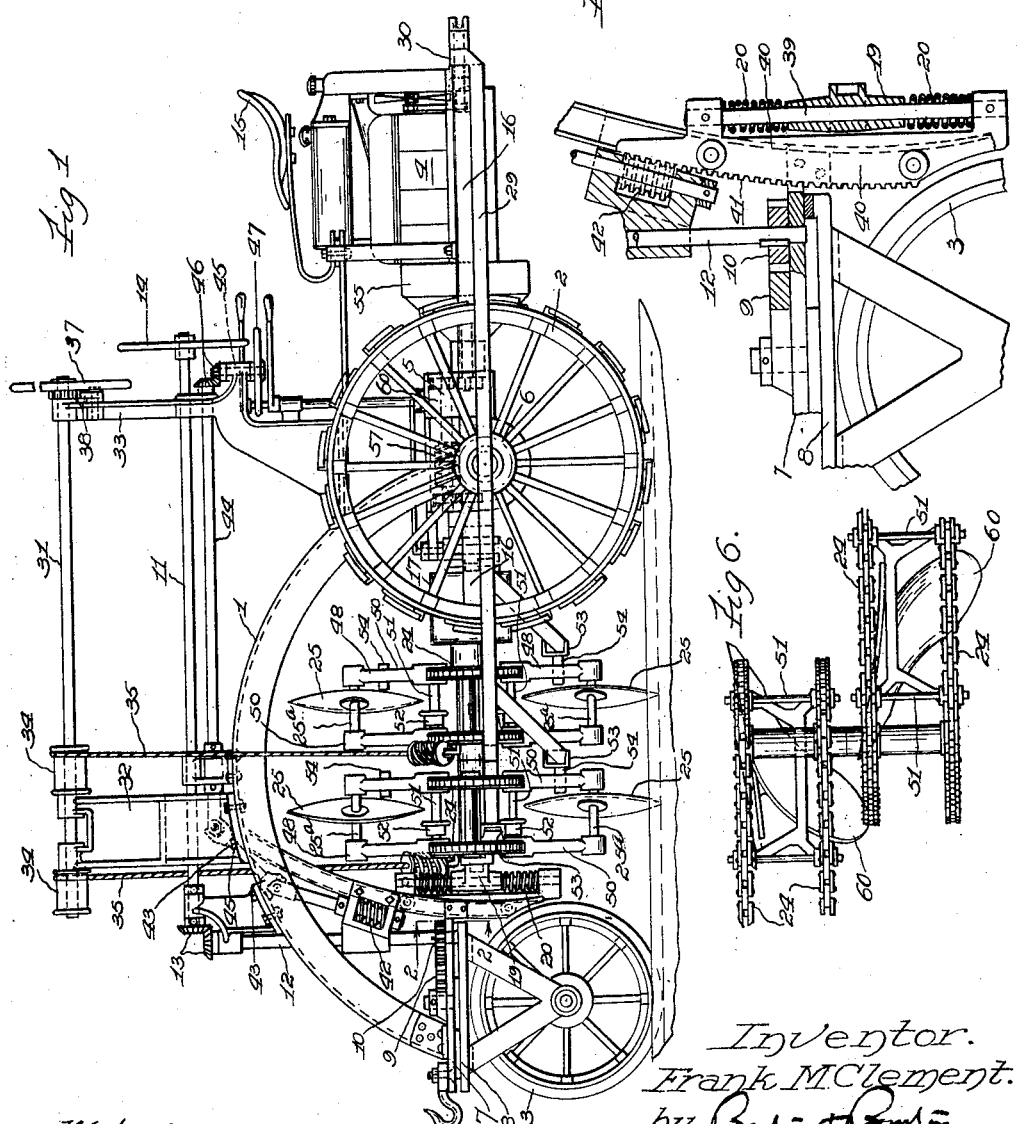

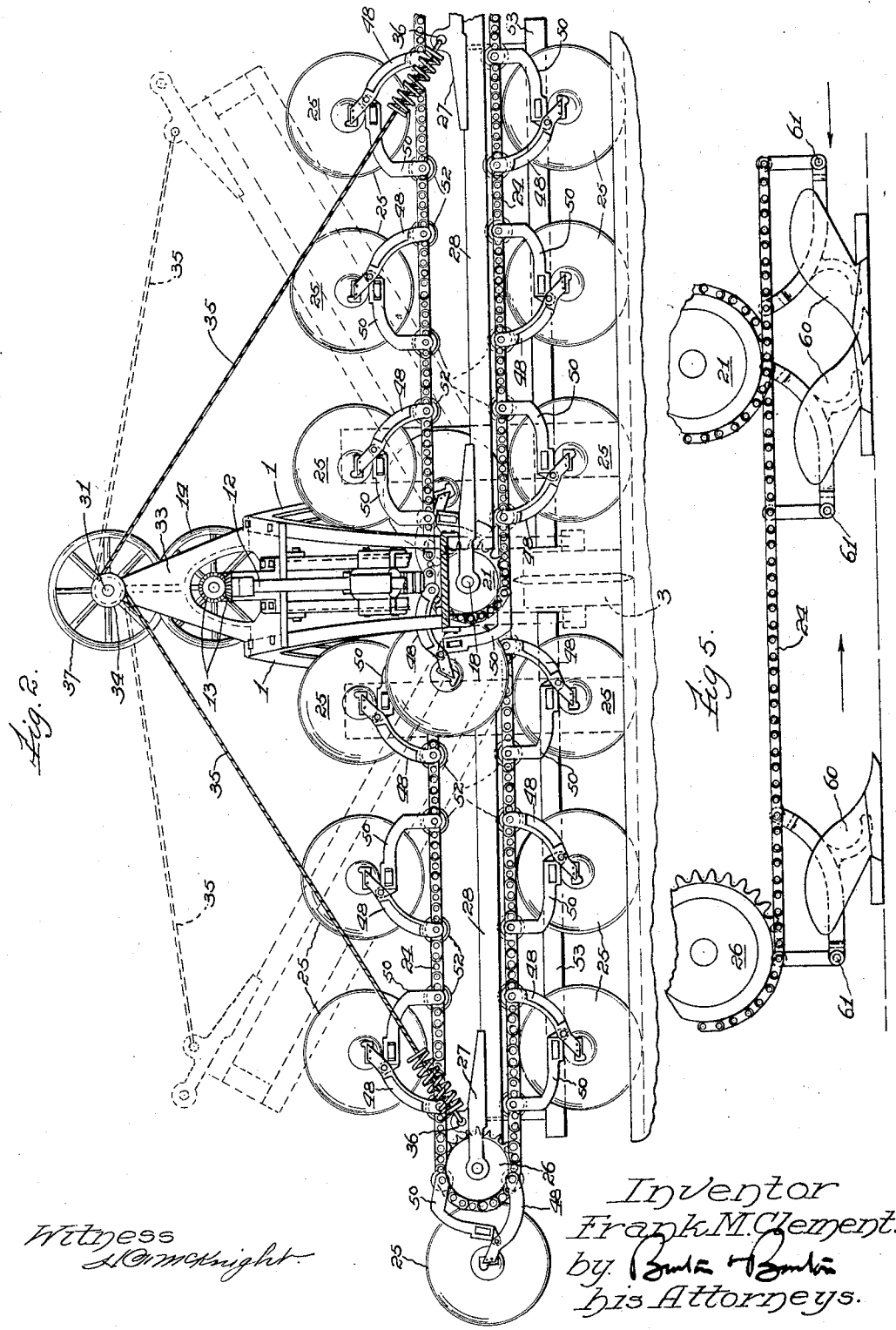

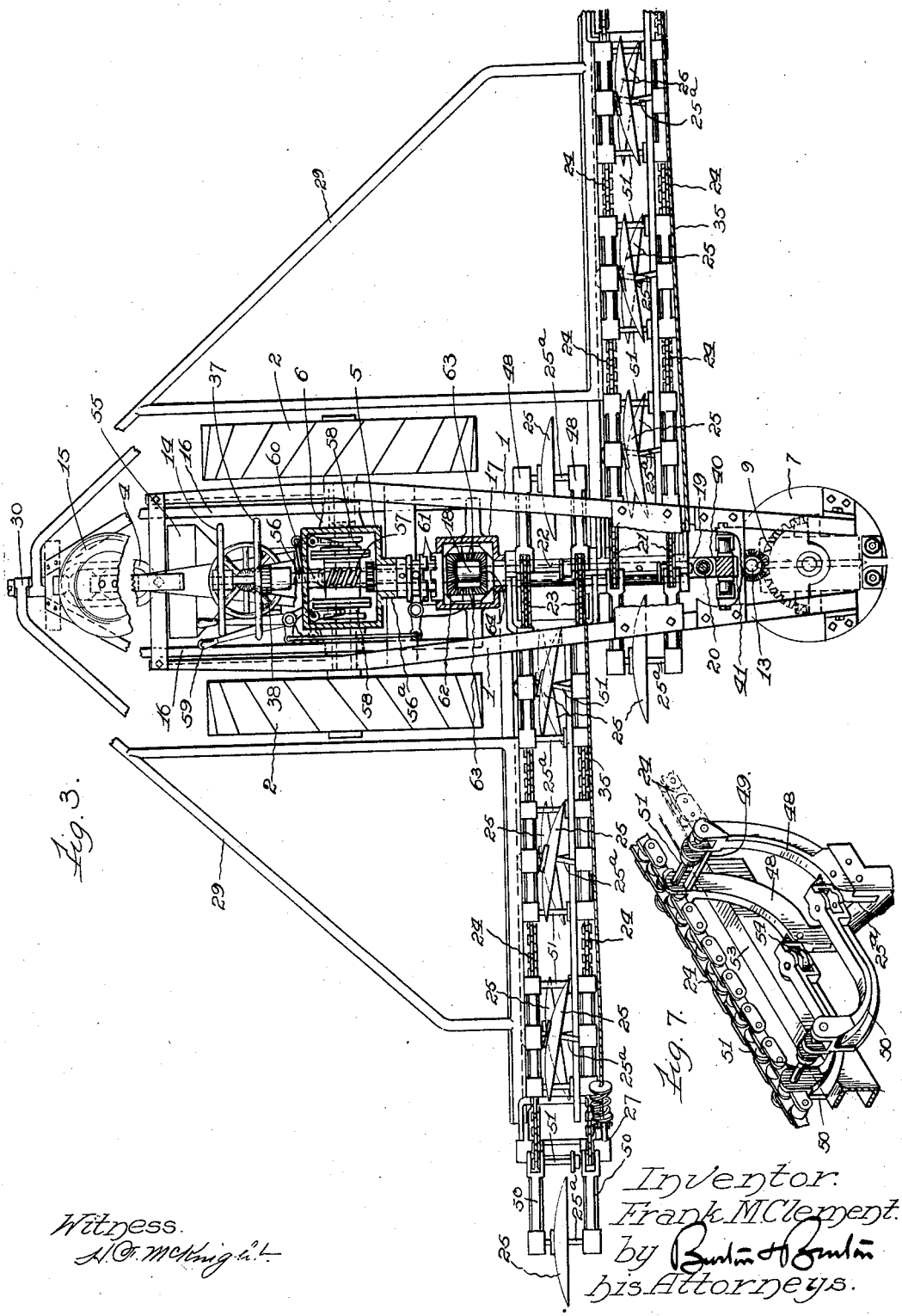

Patented Aug. 27, 1929.

1,726,177

UNITED STATES PATENT OFFICE.

FRANK M. CLEMENT, OF BELOIT, WISCONSIN.

POWER-DRIVEN PLOW.

Application filed June 28, 1926. Serial No. 118,885.

The purpose of this invention is to provide a plowing machine adapted to be operated by a power plant which it carries, and arranged to utilize the reaction of the plowing means against the soil to give traction and by which the machine is advanced bodily by the plowing operation, and thus the need of a separate tractor to pull the plow is eliminated. The invention consists in the novel arrangement and combination of certain features and elements of construction as herein shown and described and as indicated by the claims.

In the drawings:

Figure 1 is a side elevation of a power driven plow embodying my invention.

Figure 2 is an end elevation with certain parts broken away or indicated in dotted outline.

Figure 3 is a top plan view of the machine with a portion of the power plant omitted to condense the view.

Figure 4 is an enlarged detail elevation partly in section showing mechanism for adjusting the level of the plow blades.

Figure 5 is a fragmentary and somewhat diagrammatic elevation to show the application of the plowshares of the conventional type to the machine.

Figure 6 is a top plan view illustrating the modified structure shown in Figure 5.

Figure 7 is a perspective fragmentary view of the carrier frame for supporting a disk plow blade used with the machine.

As illustrated in the drawings, the machine consists of a vehicle frame carried on suitable supporting wheels and itself supporting the power plant which may be of any conventional type such as a gasoline engine. Auxiliary frames attached to the vehicle frame provide supports for endless chains arranged to travel transversely of the movement of the vehicle itself. Each of these chains carries a plurality of plow blades which may be of the circular disk type or of the more conventional plowshare form, and these blades are set somewhat oblique to the direction of movement of the chains so that as they are dragged through the top soil the lateral pressure against the blades produces a reaction tending to move the vehicle and thus causing it to travel over the ground for shifting the blades from one area to another.

The vehicle frame consists of side members, 1, 1, supported on a pair of bull wheels, 2, 2, and preferably a single steering wheel, 3. The wheels, 2, are arranged to be driven when desired by the engine, 4, particularly when the machine is being moved from one area of operation to another with its plows standing idle. Any suitable means may be used for this driving connection, and such means is conventionally indicated by a gear box, 5, adjacent the axle of the wheels, 2. The side frame members, 1, 1, are of arched form rising from the bull wheel axle, 6, passing over the plowing mechanism and extending thence downwardly for attachment to a plate, 7, forming the upper member of a fifth wheel to which the lower plate, 8, is pivotally attached for steering motion of the wheel, 3. Such steering is effected through a spur gear segment, 9, and pinion, 10, operated through a shaft, 11, and shaft, 12, connected by bevel gears at 13, and provided with a hand wheel, 14, within convenient reach of the driver's seat, 15.

A sub-frame, 16, supports the engine, 4, at one end beyond the wheels, 2, and at the other end is attached rigidly to a gear housing, 17, from which a power shaft 18 extends forwardly in alignment with the shaft of the engine, 4, to a bearing block, 19, mounted between cushion springs, 20, 20, supported adjustably on the main frame of the vehicle. The shaft, 18, carries a pair of sprocket wheels, 21, near its forward end and rearwardly of said sprockets a sleeve, 22, carrying a second pair of sprockets, 23; the sprockets, 23, are adapted by means of gearing in the housing, 17, to rotate in opposite direction from the sprockets, 21, on the shaft, 18, and each of the four sprocket wheels engages an endless chain, 24, for operating the plow blades. These blades are shown as disks, 25, in Figures 1, 2 and 3, attached to the endless chains, 24, at intervals, and said chains are mounted for travel over idler sprockets, 26, journaled in brackets, 27, which are mounted at the outer ends of laterally extending guide rails, 28. Said rails, 28, are parts of outrigger frames having oblique brace arms, 29, which extend rearwardly to a pivotal connection at 30, substantially at the axis of the power shaft, 18, and the guide rails, 28, are themselves pivotally attached to the machine at this same axis forwardly of the gear housing, 17.

This pivotal mounting of the outrigger frames allows them to be swung up as indicated in dotted lines in Figure 2 to lift the plow blades clear of the ground when the machine is to be shifted from one location to another. For thus lifting the frames and plow blades a winding shaft, 31, is mounted in brackets, 32 and 33, extending upwardly from the frame of the vehicle and is fitted with winding drums, 34, for cables, 35, which are attached respectively to the outer portions of the outrigger frames, preferably to lugs, 36, on the brackets, 27, as shown in Figure 2. A hand wheel, 37, on the shaft, 31, is located within reach of the operator and is provided with a ratchet detent, 38, for holding the frame at elevated position.

The bearing block, 19, is mounted for vertical adjustment to vary the depth to which the plow blades or disks shall enter the ground. Said bearing block is slidable through a short range limited by the cushion springs, 20—20 on a guide rod, 39, secured in a yoke, 40, and the back of the yoke is formed as a gear segment having teeth, 41, arranged to mesh with a worm, 42. Through a universal joint connection, 43, this worm is operatively linked to a shaft, 44, and thence through a short shaft, 45, and bevel gears, 46, to a hand wheel, 47, readily accessible by the operator so that vertical adjustment of the plow blades may be made at any time and may be varied while the machine is running. The sub-frame, 16, being rockable about the axis of the wheels, 2, is tilted slightly by this up or down adjustment of the forward end of the shaft, 18, and said shaft, together with the engine, 4, moves as a unit with the frame as it is tilted. This raising or lowering of the forward end of the shaft, 18, does not constitute a complete adjustment of the plow disks but for varying the depth at which they shall work the outrigger frames will also be adjusted by means of the hand wheel, 37. The detent, 38, will maintain the outriggers at any desired elevation and the worm, 42, will hold the segment on the yoke, 40, at any position of adjustment; therefore it is possible to keep the two sets of plow disks in horizontal alignment at various positions of adjustment and to hold them at any desired depth in the ground.

Each of the disks, 25, is attached to two parallel chains, 24, by means of a carrier comprising four arms pivotally connected to the chains. One pair of arms, 48, may be integrally connected together by a cross bar, 49, to lend rigidity to the carrier frame. The other two arms, 50, are pivotally connected to the arms, 49, to allow the frame to traverse the chain sprockets without difficulty. The two chains, 24, are also cross-connected at the pivot connections of the disk carriers by short axles, 51, on which flanged antifriction rollers, 52, are carried in position to bear against the under side of the guide rail, 28, as the disks, 25, are drawn through the soil in their working travel. The disks are placed slightly oblique to the planes of travel of the chains, 24, and the resulting pressure is received by a second guide rail, 53, whose vertical surface is positioned to engage rollers, 54, set in suitable recesses formed in the carrier arms, 50. The disks, 25, are rotatably carried on short axles, 25$^a$, supported by the lower ends of the carrier arms, 48. As shown in the drawings the parallel chains, 24, are duplicated so that one pair of such chains extends from each side of the vehicle, though one pair is offset from the other along the power shaft, 18, to provide space for the four driving sprockets, 21 and 23, as shown in Figure 3. It may be understood that the engine, 4, is provided with any suitable form of friction clutch located in or adjacent to its fly wheel, 55, and that through such a clutch the power is transmitted to a longitudinal shaft, 56, shown with a worm, 57, which may be understood as meshing with a worm gear for driving the bull wheels, 2. Separate clutches, 58, may be provided for said wheels if desired for varying the portion of the power transmitted to them or for allowing one of said wheels to run idle in making turns. A control lever is conventionally shown at 59 for said clutches. The shaft, 56, extends through the gear housing, 60, and its terminal portion is geared to a drive sleeve, 56$^a$. A jaw clutch is shown at 61 for connecting the sleeve, 56$^a$, to the shaft, 18, at will. Within the housing, 17, a bevel gear, 62, meshes with a pair of idlers, 63, which in turn transmit motion to a bevel gear, 64, fast on the end of the sleeve, 22, which carries the sprockets, 23, so that the sleeve, 22, is driven simultaneously with the shaft, 18, but in the opposite direction. Thus the plow blades are drawn inwardly,—that is, toward the longitudinal axis of the vehicle while they engage the soil, so that with the disks, 25, set obliquely as shown, they will tend to produce a movement of the vehicle rearwardly,—that is, with the bull wheels, 2, leading and the steering wheel, 3, following. It is obvious that if preferred the disks may be set oppositely so as to cause movement of the vehicle in the other direction, or they could be driven with the chains, 24, traveling outwardly instead of inwardly to produce this result. The speed at which the vehicle will be caused to travel will depend largely upon the character of the soil and the readiness with which it yields or breaks up as the plow blades are drawn through it.

In Figures 5 and 6 I have illustrated a method of mounting plowshares, 60, of conventional shape on the chains, 24, in place of the disks, 25. This requires only a slight change in the carrier frames which must still be articulated by pivotal joints, 61, but which may be used without the provision of the lower guide rails, 53. It will be understood that the mold boards of all the plowshares will be mounted facing in the same direction so that the pressure of the earth against the mold boards will operate always in the same direction for propelling the vehicle.

In certain kinds of soil if desired, the bull wheels, 2, may be driven at slow speed to assist the travel of the vehicle or to regulate it to insure thorough action on the soil by the plow blades, so that the rate of advance of the vehicle may be a little faster or a little slower than the action of the propelling blades themselves would secure. Also in traversing a field back and forth, the bull wheels will be brought into action in making a turn with the plow blades elevated by means of the winding drums and their cables, 35.

Just beyond the steering wheel, 3, I have shown a coupling hook by which any desired machine or vehicle may be attached to the plow. For example, in some cases it will be feasible to draw a seeder directly following the plow, and hitch a harrow to the seeder so that the planting will be completed as fast as the ground is prepared for it by the machines.

I claim:—

1. In combination with a vehicle frame and supporting wheels, a sub-frame mounted to tilt about the axis of said wheels, a power plant carried by said sub-frame and a power shaft extending therefrom, a bearing for said shaft mounted for vertical adjustment on the first mentioned frame, a sprocket wheel on said shaft and an endless chain arranged to be driven by said sprocket wheel in a direction transverse to the normal direction of travel of the vehicle with a series of plow blades attached to the chain at intervals in a position to engage the ground.

2. In the combination defined in claim 1, a guide track for said chain supported at one end on said power shaft, and means for supporting and adjusting the other end of said track vertically with respect to the vehicle frame.

FRANK M. CLEMENT.